United States Patent
Alameh et al.

[19]

[11] Patent Number: 6,104,808
[45] Date of Patent: Aug. 15, 2000

[54] PORTABLE COMMUNICATION DEVICE WITH SPEAKERPHONE OPERATION

[75] Inventors: Rachid M. Alameh, Schaumburg; Robert Zurek, Antioch, both of Ill.

[73] Assignee: Motorola, Inc., Schaumburg, Ill.

[21] Appl. No.: 09/143,887

[22] Filed: Aug. 31, 1998

[51] Int. Cl.[7] ......................................... H04M 1/00
[52] U.S. Cl. ............................................... 379/433
[58] Field of Search .................... 379/420, 368, 379/433, 428; 455/575, 90

[56] References Cited

U.S. PATENT DOCUMENTS

| | | |
|---|---|---|
| 5,224,151 | 6/1993 | Bowen et al. . |
| 5,465,401 | 11/1995 | Thompson . |
| 5,729,604 | 3/1998 | Van Schyndel . |
| 5,790,679 | 8/1998 | Hawker et al. . |
| 5,828,965 | 10/1998 | Brown et al. . |
| 6,046,730 | 4/2000 | Bowen et al. ......................... 379/368 |

OTHER PUBLICATIONS

International Application Number: PCT/US93/11291, International Publication Number: WO 94/13088, "Housing Assembly For A Wireless Communication Device", Nov. 22, 1993, Motorola, Inc., Kevin Kaschke, 41 pages.

Applicants: Colonna, Frank C. et al., US Patent Application Serial No. 09/081,843, filed in the name of Motorola, Inc. on May 20, 1998, entitled: "Mode–Switchable Portable Communication Device and Method Therefor".

Applicant: Clark, Joel, US Patent Application Serial No. 09/079,013, filed in the name of Motorola, Inc. on May 14, 1998, entitled: "Integrated Speaker and Assembly of a Portable Electronic Device".

*Primary Examiner*—Jack Chiang
*Attorney, Agent, or Firm*—Paul J. Bartusiak

[57] ABSTRACT

A radiotelephone (100) comprises a first housing element (202) and a second housing element (204), wherein the second housing element (204) is movingly connected to the first housing element (202) such that the second housing element (202) is settable to a substantially open position and a substantially closed position. A single speaker is utilized for private mode operation when the second housing element (202) is in the substantially open position and speakerphone operation when the second housing element (202) is in the substantially closed position. An internal opening (209), a first sound (270), and a second sound port (211) port sound such that the inside of the first housing element (202) acts as an acoustical suspension enclosure to improve audio quality in the speakerphone mode of operation.

15 Claims, 2 Drawing Sheets

6,104,808

PORTABLE COMMUNICATION DEVICE WITH SPEAKERPHONE OPERATION

FIELD OF THE INVENTION

This invention relates generally to portable communication devices and more specifically to a portable communication device with speakerphone operation.

BACKGROUND OF THE INVENTION

With the widespread popularity of portable communication devices such as cellular telephones, there has been an increasing demand for such portable communication devices to operate in more than one user mode. In a first mode of operation, here referred to as a normal-phone mode or private mode, a user first holds the portable communication device away from his ear and enters access information such as a telephone number. The input data can be verified by monitoring the information shown on a display. The user then places the portable communication device close to his ear to engage in a call.

The first mode of operation limits usability; it is sometimes desirable for the user to not have to hold the portable communication device while engaged in a call. For these reasons, a second mode of operation, a hands-free or speakerphone mode, is employed.

In the speaker phone mode, the portable communication device will emit audio information at a louder volume, thus allowing the user to hear information while the portable communication device is away from his ear. If, however, the portable communication device is in the speakerphone mode while it is close to the user's ear, acoustic shock to the user's hearing system could result. Therefore, a highly reliable mode switching system is needed to switch the phone between the normal-phone mode and the speakerphone mode of operation.

Proximity detector systems have been used to switch a portable communication device between the private mode and the speakerphone mode. The proximity detector system relies on the reception of a signal, such as an infrared or ultrasonic signal, that is reflected off the user's head to switch the phone from private mode to speakerphone mode. Although these proximity detector systems can be made reasonably reliable with the implementation of safeguards and redundancy circuitry, there is always the possibility of environmental induced failure or circuit malfunction. As a result, a portable communication device can falsely switch to a speakerphone mode even though it is close to a user's ear, thereby causing possible acoustic shock to the user's hearing system.

Portable communication devices comprising two movably connected housing elements have been developed wherein the portable communication device operates in a private-mode when the second housing element is set to a first, open position relative to the first housing element. If the second housing element is then set to a second, open position relative to the first housing element, the portable communication device will be made to operate in a speakerphone mode. When the second housing element is set to a third, closed position relative to the first housing element, the portable communication device operates in a standby mode.

A first limitation of this type of portable communication device is size. If, for example, a user wishes to mount the portable communication device on the visor of an automobile, the portable communication device may take up too much space in a partially open position. In addition, if a user wishes to attach the portable communication device to his clothing (e.g. the user's belt), having to operate the portable communication device in a partially open position may be cumbersome.

A second limitation of the prior art portable communication devices that have movably connected housing elements and that operate in a speakerphone mode is the upper limit placed on the achievable acoustical quality and loudness. As portable communication devices get smaller and thinner, space necessary for acoustical reverberation, resonance, and isolation between the front and the back sides of the speaker diminishes. Voice quality is thus degraded.

A third limitation of the prior art portable communication devices that have movably connected housing elements and that operate in the speakerphone mode is safety. There is still a remote chance that a user will be inclined to place the partially open communication device next to his ear, thereby causing acoustic shock.

Accordingly, there is a need for a portable communication device that does not rely upon a proximity detection system for switching to a speakerphone mode of operation. In addition, there is a need for setting the portable communication device to a configuration that willprevent the user from placing the portable communication device close to his ear during speakerphone operation. There is a further need for improved acoustics for better sound quality during speakerphone mode. In addition, there is a need for portable communication device that is designed so that a user will not be inclined to hold the portable communication device close to his ear during speakerphone mode.

DETAILED DESCRIPTION OF A PREFERRED EMBODIMENT

Figure 1:
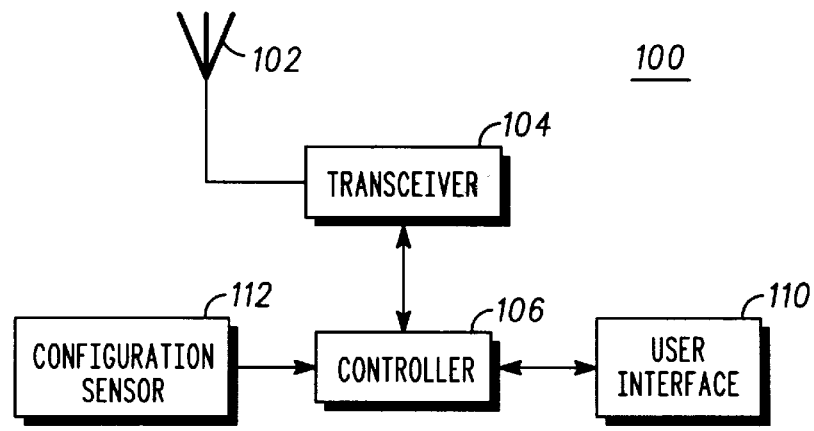
FIG. 1 is an illustration in block diagram form of a portable communication device capable of mode-switching.

FIG. 1 is an illustration in block diagram form of a portable communication device, here referred to as radiotelephone 100, that is capable of mode-switching between a private mode and a speakerphone mode. The radiotelephone 100 provides two-way voice communication and can also include data transfer functions such as internet connectivity, email, and FAX capability.

To transmit radio frequency (RF) signals containing transmit data (such as voice, digital information, or control signals) from the radiotelephone 100, a user interface 110 directs user input data to a controller 106. The controller 106 typically includes a microprocessor, memory, a clock generator, and digital logic. The controller 106 formats the transmit data obtained from the user interface 110 and conveys it to a transmitter within transceiver 104 for conversion into RF modulated signals. The transceiver 104 conveys the RF modulated signals to the antenna 102 for transmission.

The radiotelephone 100 detects RF signals containing receive data through the antenna 102 and produces detected RF signals. A receiver within the transceiver 104, coupled to the antenna 102, converts the detected RF signals into electrical baseband signals, demodulates the electrical baseband signals, recovers the receive data, including automatic frequency control information, and outputs the receive data to the controller 106. The controller 106 formats the data into recognizable voice or data information for use by user interface 110. The user interface 110 communicates the received information or voice to a user. Typically, the user interface 110 includes a microphone, a speaker, a display, a keypad, and special function input elements. The user interface 110 also comprises an activation element, responsive to a user input, for producing an activation signal.

The configuration sensor 112 continuously detects the physical configuration of the radiotelephone 100 and sends a position signal to the controller 106. The controller 106 operates the radiotelephone 100 in any of a private-mode, a speakerphone mode, and a standby mode in response to the position signal and the activation signal.

Figure 2:
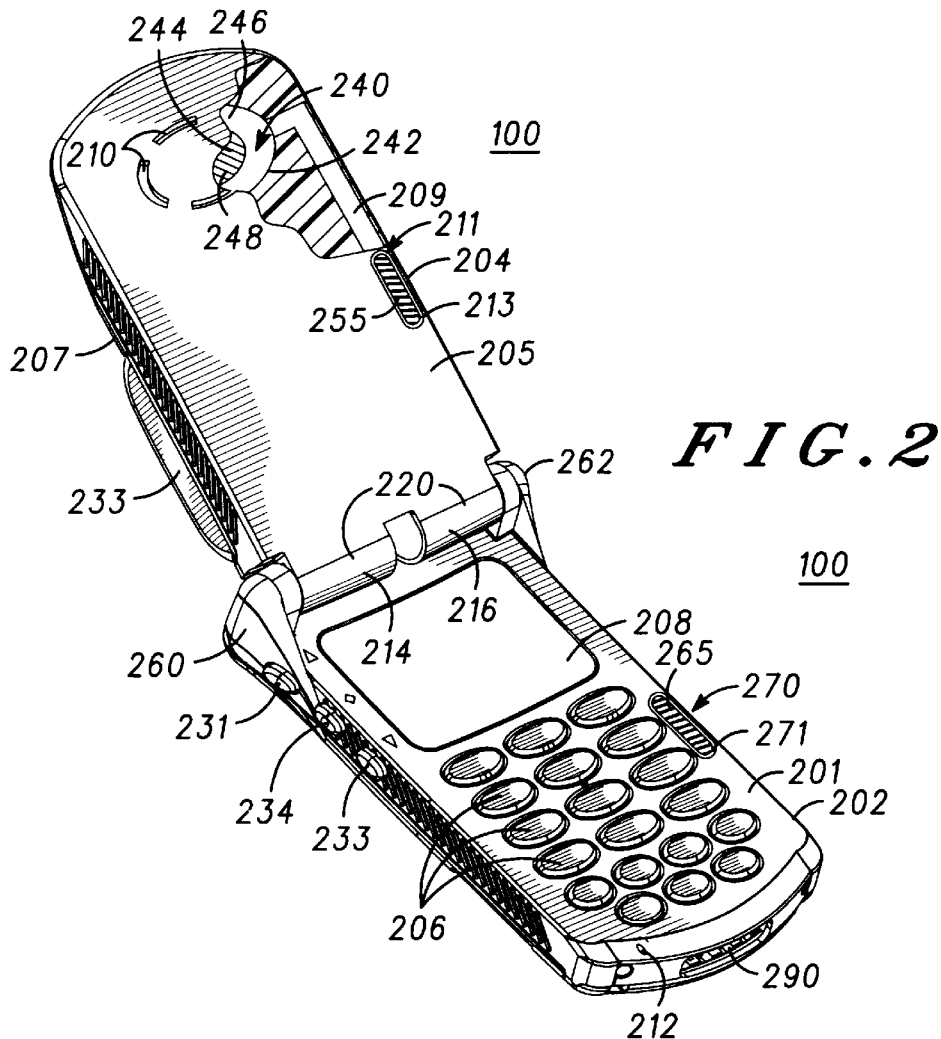
FIG. 2 is an outer view of a portable communication device in a private-mode configuration.

FIG. 2 is an outer view of a portable communication device in a private mode configuration. The radiotelephone 100 comprises a first housing element 202 and a second housing element 204 that is movably connected to the first housing element 202. The first housing element 202 and the second housing element 204 are movably connected through a hinge 220, and the second housing element 204 is settable to a substantially open position (FIG. 2) and a substantially closed position (FIG. 3) relative to the first housing element 202. The substantially open position is for operating the radiotelephone 100 in the private mode; the user places the microphone 212 close to his mouth and the earpiece opening 210 close to his ear to engage in a call.

The second housing element 204 has a front surface 205 and a back surface 207. The front surface 205 is formed to have an earpiece opening 210 for transmitting audio signals from the back speaker side 244, also referred to as a first speaker side, when the second housing element 204 is in the substantially open position. This corresponds to the private mode configuration. The earpiece opening 210 consists of a plurality of slots concentrically located about a perimeter of the speaker magnet 248. The plurality of slots are located outside the perimeter of the speaker magnet 248 so that acoustical signals can travel from the speaker diaphragm 246 to the earpiece opening 210.

The first housing element 202 carries a display 208 for displaying messages and information, a keypad 206 for entering user input, and the microphone 212. A latch 302 (shown in FIG. 3) couples the battery 233 to the second housing element 204. An external power supply receptacle 290, disposed on the first housing element 202, is for connection to an external power supply.

The first housing element 202 is formed to have an internal cavity for carrying circuitry and for serving as an acoustical suspension enclosure. The first housing element 202 is also formed to have a first sound port 270 located on a surface 201 of the first housing element 202 such that the internal cavity is acoustically coupled to the first sound port 270. A first gasket 271 formed of a rubber material is attached to the first sound port 270. The first housing element 202 is also formed to have a grill 265 for preventing foreign material from entering the first sound port 270.

The first housing element 202 also carries special function input elements 231, 233, and 234. Special function input element 231 is for increasing the volume of audio signals while special function input element 233 is for decreasing the volume of audio signals. In addition, special function input elements 231 and 233 can be used to scroll through menus and information. Special function element 234 is used for initiating different menus. Special function element 234 is also used for speakerphone mode and will thus be referred to as activation element 234. In the illustrated embodiment the activation element 234 is on the first housing element 202; in an alternate embodiment the activation element is disposed on the second housing element 204. In another alternate embodiment, an additional, separate input element serves as a dedicated activation element, and the dedicated activation element can be carried on either of the first housing element 202 and the second housing element 204.

A cutaway view of the second housing element 204 shows that the second housing element 204 contains a single speaker 240 that has a front speaker side 242, also referred to as the second speaker side, and a back speaker side 244, also referred to as the first speaker side. The back speaker side 244 is designated as the side of the speaker diaphragm 246 that carries the speaker magnet 248, also referred to as a speaker motor. The second housing element 204 is formed to have an internal opening 209, and the second housing element is also formed to have a second sound port 211. The second housing element 204 is formed to have a grill 255 for preventing foreign material from entering the second sound port 211. The second sound port 211 is located on a front surface 205 of the second housing element 204 and is in fluid communication with the single speaker 240 through the internal opening 209.

In the illustrated embodiment the single speaker 240 is positioned within the second housing element 204 such that the front speaker side 242, also referred to as the second speaker side, is directed towards the back surface 207. In addition, the back speaker side 244, also referred to as the first speaker side, is directed towards the front surface 205. Thus the side of the single speaker 240 that carries the speaker magnet 248 is directed towards the earpiece opening 210. In an alternate embodiment, the single speaker is positioned within the second housing element 204 such that the front speaker side 242 is directed towards the front surface 205 and is then referred to as the first speaker side, while the back speaker side 244 is directed towards the back surface 207 and is then referred to as second speaker side. Thus, the side of the single speaker 240 that carries the speaker magnet 248 is directed towards the speakerphone opening 237 (FIG. 3).

The second sound port 211 is substantially identical in shape and size as the first sound port 270 and is positioned such that the first sound port 270 and the second sound port 211 substantially align and couple when the second housing element 204 is set to the substantially closed position, thereby allowing acoustical signals to be coupled from the single speaker 240 to the internal cavity of the first housing element 202.

Figure 3:
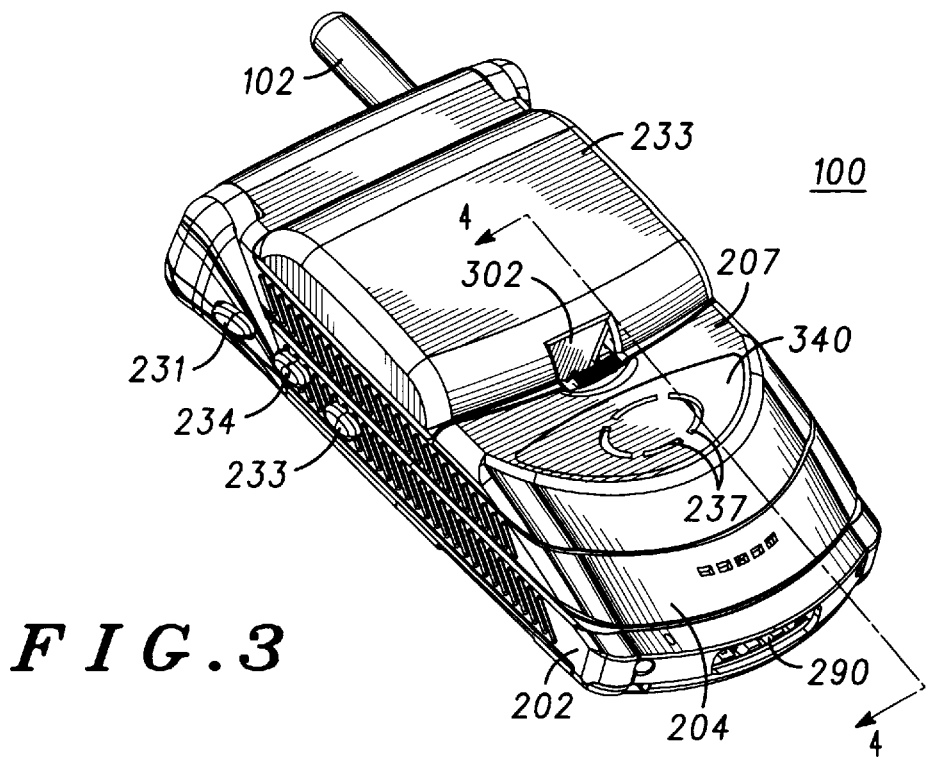
FIG. 3 is an outer view of the portable communication device of FIG. 2 in a speakerphone configuration.

FIG. 3 is an outer view of the radiotelephone 100 in a speakerphone configuration and standby configuration. To switch operation of the radiotelephone 100 from private mode to speakerphone mode, the user must first toggle the activation element 234 and then close the second housing element 204. The controller 106 monitors how much time has elapsed between toggling the activation element 234 and when the second housing element 204 has been moved to the substantially closed position.

To switch operation from private mode to speakerphone mode, the second housing element 204 must be set to the substantially closed position within a first predetermined period of time after the activation element 234 has been toggled. In the illustrated embodiment, the first predetermined period of time is four seconds. The configuration sensor 112 continuously monitors the position of the second housing element 204 relative to the first housing element 202 and generates a position signal that indicates the physical configuration of the radiotelephone 100. The controller 106 continuously monitors the position signal for determining whether to switch the operation of the phone. Therefore, when the radiotelephone 100 is in private mode and the activation element is toggled, the controller 106 (FIG. 1) begins to monitor elapsed time. If the second housing element 204 is not set to the substantially closed position within the first predetermined period of time (e.g. the second housing element 204 is left in the substantially open position), the radiotelephone 100 will continue operation in the private mode.

The configuration sensor 112 comprises consists of a magnet located in the second housing element 204, a Reed switch located in the first housing element 202, and circuitry coupled to the Reed switch to develop the position signal. Alternatively, the hinge 220 that movably connects the first housing element 202 and the second housing element 204 can contain the configuration sensor 112 in the form of a rotary switch coupled to sensor circuitry.

If the activation element 234 is toggled during private mode operation and the second housing element 204 is set to the substantially closed position, but not within the first predetermined period of time, the controller 106 will begin to monitor time anew, starting from the time when the second housing element 204 was set to the substantially closed position. If the user does not move the second housing element 204 back to the substantially open position within a second predetermined period of time, the controller 106 will end the telephone call and operate the radiotelephone 100 in the standby mode. In the illustrated embodiment, the second predetermined period of time is four seconds. If, however, the user does move the second housing element 204 back to the substantially open position within the second period of time, this indicates that the user did not mean to end the telephone call, and the controller 106 will continue to operate the radiotelephone 100 in the private mode. In addition, if the user has not toggled the activation element 234 and sets the second housing element 204 to the substantially closed position, the controller 106 ends the telephone call and operates the radiotelephone 100 in the standby mode.

Another way to switch operation from private mode to speakerphone mode is for the user to hold the activation element 234 toggled while the second housing element 204 is set to the substantially closed position. In the preferred embodiment the activation element 234 is a button. Thus, to switch operation from private mode to speakerphone mode, the user can hold the activation element 234 pressed while setting the second housing element 234 to the substantially closed position. For this implementation, not timers are necessary.

The user can also switch the operation of the radiotelephone 100 from the standby mode to the speakerphone mode. For example, while the radiotelephone 100 is in the standby mode with the second housing element 204 in the substantially closed position, the user can toggle the activation element 234 and switch operation to the speakerphone mode. Voice recognition circuitry then allows the user to dial a telephone number and activate a telephone call with the second housing element 204 remaining in the substantially closed position.

Alternatively, if the radiotelephone 100 is in the standby mode and rings to indicate an incoming call, a user can answer the call by leaving the second housing element 204 in the substantially closed position and toggling the activation element 234. The controller 106 will then activate the radiotelephone 100 to answer the call and operate the radiotelephone 100 in the speakerphone mode. Moving the second housing element 204 to the substantially open position immediately causes the controller 106 to operate the radiotelephone 100 in the private mode. It will be obvious to those skilled in the art that other combinations of the activation element 234 and the setting of the second housing element 204 can be used to operate the radiotelephone in private mode, speakerphone mode, and standby mode.

In the speakerphone mode, the gain of the audio circuitry driving the single speaker 240 is increased by substantially thirty dB (compared to the gain of the audio circuitry when the phone is operating in the private mode) so that the user can hear the single speaker 240 output even though the radiotelephone 100 is not immediately adjacent to the user's ear. When audio signals are not present at the single speaker 240, the gain of the circuitry coupled to the microphone 212 is increased by substantially thirteen dB (relative to the private mode gain setting) in order to increase the sensitivity of the microphone 212. When audio signals are present at the single speaker 240, the gain of the circuitry coupled to the microphone 212 is then decreased by substantially thirteen dB in order to reduce speaker-to-microphone feedback. The gain of the circuitry coupled to the microphone 212 is only decreased during periods when high audio peaks are present at the single speaker 240 rather than the entire time when audio signals are present at the single speaker 240.

The second housing element 204 has a back surface 207 that is formed to have a speakerphone opening 237 for transmitting audio signals from the single speaker 240 when the second housing element 204 is set to the substantially closed position. The speakerphone opening 237 consists of a plurality of slots concentrically located about a perimeter of the speaker magnet 248. The plurality of slots are located outside the perimeter of the speaker magnet 248 so that acoustical signals can travel from the speaker diaphragm 246 to the speakerphone opening 237. A removable section 340 of the back surface 207 can be removed for access to the single speaker 240 and associated circuitry.

The plurality of slots that make up the earpiece opening 210 are located such that when the second housing element 204 is in the closed position, each of the plurality of slots seals against one of the plurality of keys comprising the keypad 206. This reduces the amount of sound that is leaked through the earpiece opening 210 during speakerphone mode.

When the radiotelephone 100 is operating in the speakerphone mode and the user moves the second housing element 204 back to the substantially open position (FIG. 2), the controller 106 will switch operation to the private mode. When the operation of the portable communication 100 is changed from speakerphone mode to private mode, the gain of the circuitry driving the single speaker 240 is decreased by substantially thirty dB, and the gain of the circuitry coupled to the microphone is decreased by substantially thirteen dB from its speakerphone gain setting.

The radiotelephone can operate in the standby mode when the second housing element 204 is in the substantially open position and the substantially closed position. The standby mode is a mode in which certain circuitry is powered down to save energy, while other circuitry remains active in order to receive incoming calls.

Figure 4:
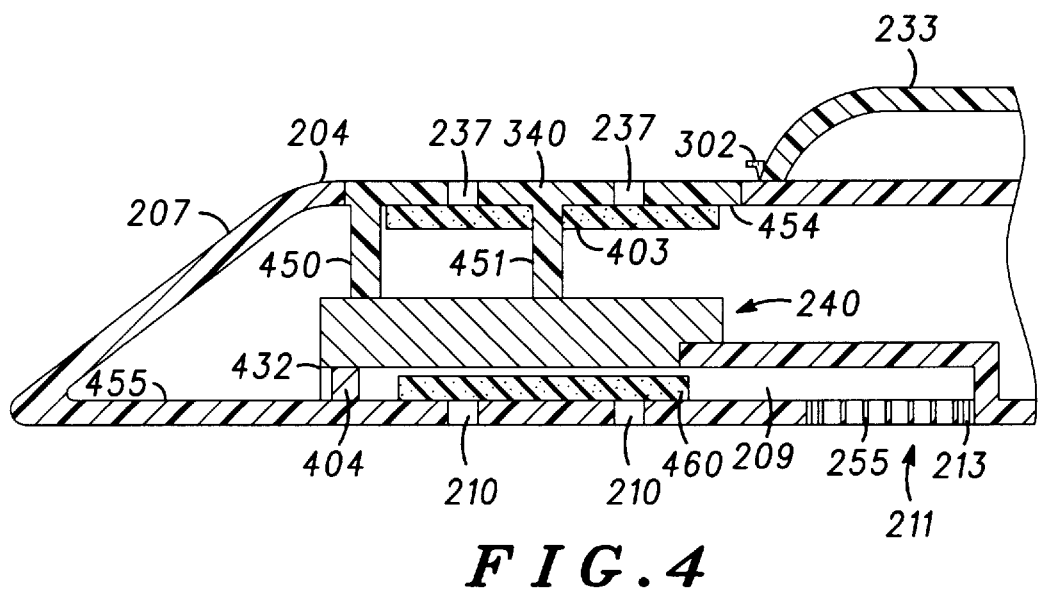
FIG. 4 is a portion of a side view of the second housing element of the portable communication device of FIG. 2; a cutaway view shows a portion of the speaker and an internal opening coupled to a sound port.

FIG. 4 is a portion of a side view of the second housing element 204. A cutaway view reveals the single speaker 240 resting on a speaker standoff 404. The speaker standoff 404 extends for substantially three quarters of the diameter of the single speaker 240. The speaker standoff 404 does not extend completely around the perimeter of the single speaker 240 so that the wall formed by the speaker standoff 404 does not acoustically block the internal opening 209. A piece of adhesive material 432 can be used to adhere the single speaker 240 to the speaker standoff 404. In addition, the inside surface 454 of the removable section 340 can be formed to have a first tab 450 and a second tab 451 to press the perimeter of the single speaker 240 against the speaker standoff 404.

A felt material 403 is attached to the inside surface 454 and is located between the speakerphone opening 237 and the single speaker 240. The felt material 403 serves as an acoustical resistor and prevents foreign material from entering the speakerphone opening. When the radiotelephone 100 is in the substantially open position, the felt material 403 minimizes acoustical signals from leaking out of the speakerphone opening 237, thereby enhancing privacy. A second piece of felt material 460 is attached to a second inside surface 455 to prevent foreign material from entering the private mode opening 210.

The mode-switchable radiotelephone has a significant advantage over a conventional radiotelephone. Setting the second housing element to the substantially closed position while pressing an activation element button or after toggling the activation element for the speakerphone mode of operation helps prevent the user from placing the mode-switchable radiotelephone close to his ear during the speakerphone mode. Furthermore, the collapsed form factor of the mode-switchable radiotelephone is yet another visual indication to the user not to place the mode-switchable radiotelephone close to his ear during speakerphone operation. Thus, the likelihood of accidental acoustic shock to the user's ear is greatly reduced. Utilizing a single speaker for both private mode and speakerphone mode operation reduces radiotelephone manufacturing cost and decreases the size of the radiotelephone, which are both highly desirable characteristics. The internal opening for coupling signals through sound ports to an acoustical suspension enclosure significantly improves sound quality during speakerphone operation.

The previous description of the preferred embodiments are provided to enable any person skilled in the art to make or use the mode-switchable radiotelephone. Various modifications to these embodiments will be readily apparent to those skilled in the art, and the generic principles defined herein may be applied to other embodiments without the use of the inventive faculty.

What is claimed is:

1. A portable communication device comprising:
    a first housing element containing a microphone;
    a second housing element that is movably connected to the first housing element and settable to a substantially open position and a substantially closed position relative to the first housing element, the second housing element containing a single speaker having a first speaker side and a second speaker side, the second housing element having a front surface formed to have an earpiece opening for transmitting audio signals from the first speaker side when the second housing element is in the substantially open position, the second housing element having a back surface formed to have a speakerphone opening for transmitting audio signals from the second speaker side when the second housing element is set to the substantially closed position;
    a sensor coupled to the first housing element and the second housing element for detecting a position of the second housing element relative to the first housing element and producing a position signal;
    an activation element disposed on one of the first housing element and the second housing element, the activation element producing an activation signal in response to a user input; and a controller carried in one of the first housing element and the second housing element, the controller for operating the portable communication device in one of a standby mode, a speakerphone mode, and a private mode in response to the position signal and the activation signal.

2. The portable communication device as in claim 1, wherein:
    the first housing element is formed to have an internal cavity and formed to have a first sound port located on a surface of the first housing element such that the internal cavity is acoustically coupled to the first sound port; and
    the second housing element is formed to have an internal opening and a second sound port, the second sound port located on the front surface of the second housing element and in fluid communication with the single speaker through the internal opening, the second sound port substantially identical in shape and size as the first sound port and positioned such that the first sound port and the second sound port substantially align and couple when the second housing element is set to the substantially closed position, thereby allowing acoustical signals to be coupled from the single speaker to the internal cavity of the first housing element.

3. The portable communication device as in claim 2 further comprising:
    a first gasket attached to the first sound port; and
    a second gasket attached to the second sound port to enhance acoustical coupling between the first sound port and the second sound port and to remove vibrational noise.

4. The portable communication device as in claim 2, wherein the controller operates the portable communication device in the private mode when the controller detects the position signal indicating that the second housing element is in the substantially open position, and the controller operates the portable communication device in the standby mode when the controller detects the position signal indicating that the second housing element is in the substantially closed position and the controller does not detect the activation signal.

5. The portable communication device as in claim 4, wherein the controller switches operation from the private mode to the speakerphone mode when the controller detects the activation signal and then the controller detects the position signal indicating that the second housing element has been moved from the substantially open position to the substantially closed position, and the controller switches operation from the standby mode to the speakerphone mode when the controller detects the position signal indicating that the second housing element is in the substantially closed position and then the controller detects the activation signal.

6. The portable communication device as in claim 5, wherein the sensor comprises:
    a magnet located in the second housing element;

a Reed switch located in the first housing element; and circuitry coupled to the Reed switch to develop the position signal.

7. The portable communication device as in claim 5 further comprising a hinge to movably connect the first housing element and the second housing element, the hinge containing the sensor with a rotary switch coupled to sensor circuitry.

8. A radiotelephone comprising:

a first housing element containing a microphone and formed to have an internal cavity for functioning as an acoustical suspension enclosure, the first housing element formed to have a first sound port located on a surface of the first housing element such that the internal cavity is acoustically coupled to the first sound port;

a second housing element that is movably connected to the first housing element and settable to a substantially open position and a substantially closed position relative to the first housing element, the second housing element containing a single speaker having a front speaker side, a back speaker side, and a speaker magnet, the second housing element having a front surface formed to have an earpiece opening for transmitting audio signals from the back speaker side when the second housing element is in the substantially open position, the second housing element having a back surface formed to have a speakerphone opening for transmitting audio signals from the front speaker side when the second housing element is set to the substantially closed position, the second housing element formed to have an internal opening and a second sound port, the second sound port located on the front surface of the second housing element such that the second sound port is in fluid communication with the speaker through the internal opening, the second sound port substantially identical in shape and size as the first sound port and positioned such that the first sound port and the second sound port substantially align and couple when the second housing element is set to the substantially closed position, thereby allowing acoustical signals to be coupled from the speaker to the internal cavity of the first housing element;

a sensor coupled to the first housing element and the second housing element for detecting a position of the second housing element relative to the first housing element and producing a position signal;

an activation element disposed on one of the first housing element and the second housing element, the activation element producing an activation signal in response to a user input; and a controller carried in one of the first housing element and the second housing element, the controller for operating the radiotelephone in one of a standby mode, a speakerphone mode, and a private mode in response to the position signal and the activation signal.

9. The radiotelephone as in claim 8 further comprising:

a first gasket attached to the first sound port; and a second gasket attached to the second sound port to enhance acoustical coupling between the first sound port and the second sound port and to remove vibrational noise.

10. The radiotelephone as in claim 8, wherein the controller operates the radiotelephone in the private mode when the controller detects the position signal indicating that the second housing element is in the substantially open position, and the controller operates the radiotelephone in the standby mode when the controller detects the position signal indicating that the second housing element is in the substantially closed position and the controller does not detect the activation signal.

11. The radiotelephone as in claim 10, wherein the controller switches operation from the private mode to the speakerphone mode when the controller detects the activation signal and then the controller detects the position signal indicating that the second housing element has been moved from the substantially open position to the substantially closed position, and the controller switches operation from the standby mode to the speakerphone mode when the controller detects the position signal indicating that the second housing element is in the substantially closed position and then the controller detects the activation signal.

12. The radiotelephone as in claim 11, wherein the sensor comprises:

a magnet located in the second housing element;

a Reed switch located in the first housing element; and circuitry coupled to the Reed switch to develop the position signal.

13. The radiotelephone as in claim 11 further comprising a hinge to movably connect the first housing element and the second housing element, the hinge containing the sensor with a rotary switch coupled to sensor circuitry.

14. The radiotelephone as in claim 11 wherein the earpiece opening and the speakerphone opening each comprising a plurality of slots concentrically located about a perimeter of the speaker magnet.

15. The radiotelephone as in claim 14 further comprising a felt material, located between the speakerphone opening and the front speaker side.

* * * * *